May 20, 1941.   H. A. WHEELER   2,242,934
PERIODIC WAVE GENERATOR
Filed Nov. 4, 1938   2 Sheets-Sheet 1
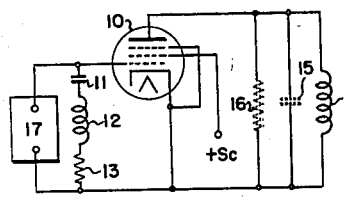
FIG.1.
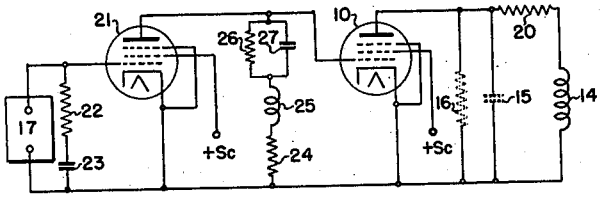
FIG.2.
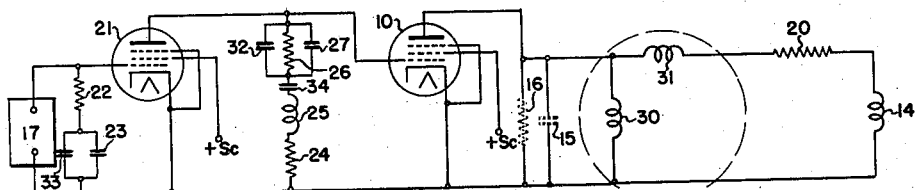
FIG.3.   TRANSFORMER
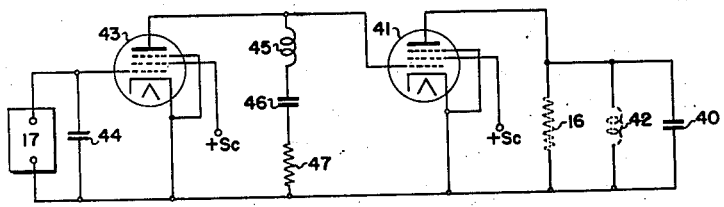
FIG.4.
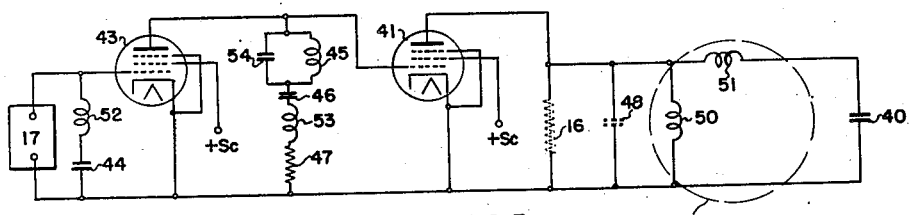
FIG.5.   TRANSFORMER
INVENTOR
HAROLD A. WHEELER
BY Lawrence B. Dodds
ATTORNEY May 20, 1941.                H. A. WHEELER                 2,242,934
                        PERIODIC WAVE GENERATOR
                         Filed Nov. 4, 1938              2 Sheets-Sheet 2
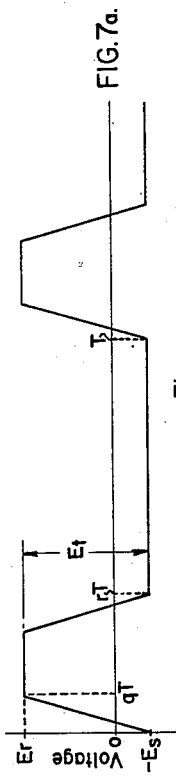
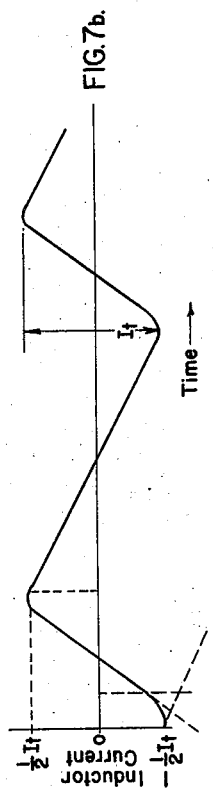
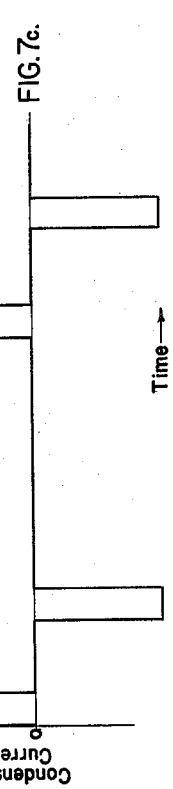
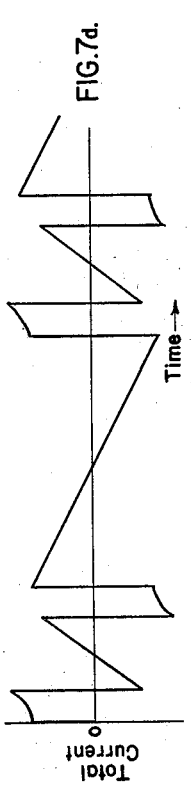
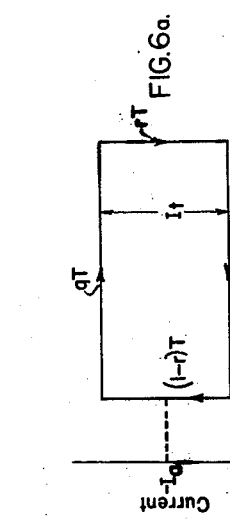
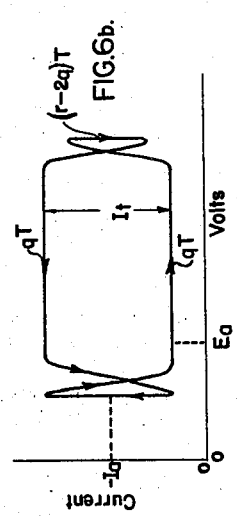
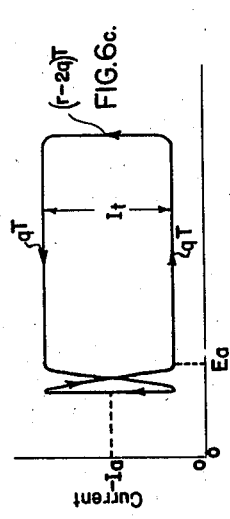
INVENTOR
HAROLD A. WHEELER
BY
ATTORNEY Patented May 20, 1941

2,242,934

UNITED STATES PATENT OFFICE 2,242,934

PERIODIC WAVE GENERATOR

Harold A. Wheeler, Great Neck, N. Y., assignor to Hazeltine Corporation, a corporation of Delaware Application November 4, 1938, Serial No. 238,757

8 Claims. (Cl. 250—36)

This invention relates to periodic wave generators or repeaters and, while of general application, the invention is of particular utility in producing scanning fields of saw-tooth wave form for television signal-translating apparatus.

In many electrical installations, it is desirable to produce an electric field, either electrostatic or electromagnetic, having a predetermined wave form including periodically recurring transients. An example of the use of such a field is in the scanning system of a television signal-translating apparatus such as a transmitter signal-generating tube or a receiver signal-reproducing tube. A field of the type under discussion is customarily produced by applying periodic waves of a predetermined wave form to a vacuum tube having an output circuit in which is included a field-producing reactance element. A current or voltage of predetermined wave form is thus required from the tube in order to provide a scanning field of the desired wave form. Thus, to provide a saw-tooth current through an inductor to procure an electromagnetic scanning field, it is customary to apply periodic current input pulses of substantially rectangular wave form to the input circuit of the vacuum tube utilized. Integrating means comprising shunt capacitance is included in the input circuit to provide a saw-tooth voltage on the grid, thus to procure the desired saw-tooth output current.

Similarly, if an electrostatic field of saw-tooth wave form is required between deflecting plates, which act as a condenser in the output circuit of the vacuum-tube repeater, the vacuum tube utilized must apply a saw-tooth voltage to the plates. The required voltage has been obtained by applying an input voltage of periodic rectangular pulses to the input circuit of the tube and integrating these pulses by means of the output capacitance.

In such systems, the internal conductance and undesired shunt susceptance of the vacuum tube and other circuit elements may be appreciable across the output circuit and, if their effects are not compensated, the relation between the input wave form and the wave form of the deflecting field is substantially different than the desired relation.

Furthermore, undesirable inherent shunt susceptance in the output circuit of the tube places an additional load on the tube. It has heretofore been proposed to compensate for the inherent shunt conductance of the vacuum-tube output circuit. For example, where an integrating capacitance is provided in the input circuit, a resistance in series therewith across the input circuit of such vacuum tube has been provided to compensate for the effective shunt conductance of the output circuit of the tube. It is also desirable to compensate for the undesired inherent shunt susceptance. If such compensating circuits are utilized to procure a field of the desired wave form, the effect is to modify the wave form of the output current or voltage of the tube to such a form that the desired scanning field is produced. This compensation, especially in the case of inherent shunt capacitance, may greatly increase the peak current required in the tube. However, for efficient operation, it is desirable to secure a maximum saw-tooth current through a deflecting inductor or maximum saw-tooth voltage across a deflecting condenser without exceeding the maximum permissible current and voltage swings of the tube utilized. In the case of inherent shunt capacitance in the output circuit, together with proper compensating circuits, the load diagram may have one or two cross-over points; that is, it may have the general configuration of a figure 8, thus comprising two loops, or under other conditions, three loops. It is found important to equalize the various maximum values which appear in the load diagram, so that the current and voltage swings may all be substantially the maximum allowable as defined by the operating characteristics of the tube.

It is, therefore, an object of the invention to provide a periodic wave generator in which there is compensation for above-mentioned disturbing factors.

It is a further object of the invention to provide an improved vacuum-tube periodic wave generator including a deflecting-field reactance in which the effect of inherent shunt reactance of the kind opposite to that of the deflecting-field reactance in the output circuit of the vacuum tube is at least partially compensated.

It is a further object of the invention to provide a vacuum-tube periodic magnetic-field generator in which the effect of shunt capacitance in the output circuit of the tube is at least partially compensated and in which the input wave form is shaped to secure a load diagram having at least one crossover, the current and voltage swings of which are each substantially the maximum allowable as determined by the operating characteristics of the tube.

In accordance with the invention, a periodic wave generator for producing an electromagnetic field of a predetermined wave form, including periodically recurring transients, comprises a vacuum-tube repeater having input and output circuits together, together with means for applying to the input circuit pulses having the same period as the above-mentioned field and having a wave form related in a predetermined manner to that of the field. Inductance means are included in the output circuit of the tube for producing the field, the output circuit having shunt capacitance effectively included therein which incidentally tends undesirably to affect the wave form of the field. Reactance means of both kinds are so connected in the input circuit and so proportioned relative to the reactance of the output circuit that one kind of reactance in the input circuit at least partially compensates for the undesirable effect of the capacitance on the wave form of the field. The circuit constants are so proportioned with respect to the wave form of the input pulses as to develop output current and voltage waves from the tube of such wave forms that their load diagram has at least one cross-over and has substantially the maximum possible dimensions within the normal operating limits of current and voltage of the tube.

Also in accordance with the invention, a periodic wave repeater for producing a magnetic field of saw-tooth wave form having relatively long trace and relatively short retrace periods comprises a vacuum tube repeater having input and output circuits and upper and lower limiting output current values, together with inductance means in the output circuit. Means are provided for exciting the repeater to supply the output circuit thereof with a unidirectional current, of substantially saw-tooth wave form having peak values approximately equal to the above-mentioned limiting values, for producing the desired field. The output circuit includes shunt capacitance requiring a rapid change of voltage during each retrace period, rapidly to change the condition of charge on the shunt capacitance. Output-current-controlling means are provided coupled to one of the above-mentioned circuits for developing an output-current pulse from the tube during each retrace interval which rapidly changes from a first value corresponding to one of the above-mentioned limiting values to a second value corresponding to the other of the limiting values and thereafter back to the first value in only a part of the retrace period for effecting the rapid change of voltage across the shunt capacitance.

For a better understanding of the invention, together with other and further objects thereof, reference is had to the following description taken in connection with the accompanying drawings and its scope will be pointed out in the appended claims.

Fig. 1 of the drawings is a circuit diagram of a periodic wave generator in accordance with the invention for providing an electromagnetic field of saw-tooth wave form; Figs. 2 and 3 are circuit diagrams of modifications of the generator of Fig. 1; Fig. 4 is a circuit diagram of a periodic wave generator in accordance with the invention for producing an electrostatic field of saw-tooth wave form; Fig. 5 represents a modification of the generator of Fig. 4; while Figs. 6a—6c illustrate load diagrams of a generator of the type shown in Fig. 1; and Figs. 7a—7d illustrate certain operating characteristics of a circuit of the type of Fig. 1.

In Fig. 1 there is shown an arrangement for producing an electromagnetic field of a desired wave form and including periodically recurring transients. The desired field may be of a saw-tooth wave form and may be utilized as a scanning field in a television signal receiver. The arrangement of Fig. 1 comprises a vacuum-tube repeater 10 having an input circuit including series-connected condenser 11, inductor 12, and resistor 13 connected thereacross. The output circuit of the tube comprises a field-producing inductor 14, through which it is desired to provide a current of the desired wave form, together with a condenser 15, which may be comprised in whole or in part in the inherent capacitance of the output circuit and the tube, and a resistor 16, representing the inherent shunt conductance of the output circuit and the tube. Also, there is provided in the circuit of Fig. 1 a source 17 for applying to the input circuit of the tube current pulses having the same period as the desired field and having a wave form related in a predetermined manner to that of the desired field. Source 17, in the usual case in which the generator is to produce a saw-tooth field, supplies a current of periodic rectangular wave form.

In considering the operation of the circuit just described, and neglecting for the moment the effect of the inherent capacitance 15 and the conductance of element 16 in the output circuit of the tube together with the effect of the compensating elements 12 and 13, it will be seen that the condenser 11 in the input circuit of vacuum tube 10 integrates the pulses of current supplied by the source 17, resulting in a saw-tooth voltage being applied to the input electrodes of the tube so that a corresponding saw-tooth current is developed in the output circuit of the tube and flows through inductor 14. Thus, the desired wave form is produced if the disturbing factors of shunt capacitance, represented by condenser 15, and shunt conductance, represented by resistor 16, are absent from the circuit. It is, therefore, necessary to correct for these disturbing properties of the circuit and it is for this reason that the corrective network, including inductor 12 and resistor 13, is provided in series with condenser 11 in the input circuit of vacuum tube 10. In other words, reactance means of both kinds are so connected in the input circuit and so proportioned relative to the reactance of the output circuit that one kind of reactance in the input circuit at least partially compensates for the undesirable effect of the capacitance 15 on the wave form of the electromagnetic field. The vacuum tube is assumed to have a linear response, that is, constant transconductance, over its operating range. In correcting for the variation of impedance of the output circuit due to the disturbing capacitance 15 and the conductance of element 16, it is necessary that the input circuit have an impedance variation reciprocal to that of the output circuit. The following equations are applicable to the circuit of Fig. 1:

$$C_{11}L_{12} = L_{14}C_{15} \qquad (1)$$

$$L_{12} = \frac{L_{14}C_{15}}{C_{11}} \qquad (2)$$

As mentioned above, the method of determining the value of the resistor 13 utilized to compensate the shunt conductance represented by resistor 16 may follow prior art practice.

It will be apparent that, since inherent shunt capacitance 15 and shunt conductance represented by resistor 16 are present in the circuit of Fig. 1 together with compensating elements therefor including inductor 12 and resistor 13, the effect is to modify the wave forms of the input voltage and output current of the tube to such forms that the desired field is produced. Also, it will be seen that elements 14, 15 have a resonance of one type (parallel resonance) at the same frequency that elements 11, 12 have a resonance of the opposite type (series resonance). This, in the usual case, greatly increases the peak output current of the tube. For efficient operation, it is desirable to secure maximum saw-tooth current through the deflecting inductor 14 without exceeding the normal current and voltage swings of the tube.

Figs. 6a—6c show load diagrams for the vacuum tube 10 for load circuits of different constants, Fig. 6a showing the simple diagram characteristic of the circuit if only load inductor 14 is included in the output circuit and compensating elements 12 and 13 are omitted. The manner of obtaining the load diagrams 6b and 6c and their purpose is more fully explained in the material relating to Figs. 7a—7d.

If the effect of elements 15 and 16, together with that of elements 12 and 13 provided for compensating therefor, is included, the wave form across inductor 14 of Fig. 1 is the same as the input wave form. If the input wave is composed of rectangular pulses, the corresponding output wave across the shunt capacitance cannot be realized because it would require momentarily infinite charging current or discharging current through the shunt capacitance 15 in addition to the saw-tooth current through the load inductance 14. In order to analyze the circuit with the object of reducing the charging and discharging current through capacitance 15 to a finite value thereby to limit the swings of tube output current and voltage, at the same time compensating for the effects of undesired output conductance and susceptance, it is arbitrarily assumed that the pulse voltage developed across the output circuit of the tube is of trapezoidal wave form, as shown in Fig. 7a, which is a reasonable approximation of the conventional rectangular-impulse wave form and it is further assumed that this wave is to be produced by an input wave of the same shape. The corresponding components of current through the inductor 14 and shunt capacitance 15 are shown in Figs. 7b and 7c, respectively. The inductor current of Fig. 7b has a saw-tooth wave form with a parabolic rounding of the corners. The capacitance current of Fig. 7c is a series of double pulses of rectangular wave form. The total output current of the tube 10 is the sum of the components of Fig. 7b and Fig. 7c and is shown in Fig. 7d. The amount of inductance permissible in the output circuit of the tube is limited by the peak voltage during the retrace interval and by the length of time available for the retrace. Therefore, the most efficient utilization of the current and voltage in the output circuit of tube 10 requires that the shunt capacitance be charged as quickly as possible to the peak voltage at the beginning of the retrace interval and discharged as quickly as possible at the end of the retrace interval. The rapidity of the charging and discharging is limited by the current swing available from the tube. Obviously, the most satisfactory arrangement is one which utilizes the entire current swing for charging and discharging the capacitance 15 and which utilizes the peak voltage thus developed across inductor 14 during the maximum portion of the retrace period. This relation determines not only the optimum value of inductor 14 but also the shape of the pulse voltage required across the output circuit of the tube.

In Fig. 7a, the period of scanning is T; the retrace time is $rT$ and the remainder is devoted to the trace. Since the trace must be linear, the voltage across inductor 14 during the trace must be constant and is denoted as $-E_s$. During the retrace, however, the shape of the pulse can be chosen to meet any desired conditions. Part of the retrace time is devoted to charging the capacitance 15 and may be denoted $qT$. A similar length of time is devoted to discharging the condenser just before the end of the retrace time. Except during the charging and discharging times, the voltage during retrace is equal to the peak voltage $E_r$. The voltage swing $E_t$ is the sum of $E_r$ and $E_s$. It is one of the factors which limits the output available from the tube. The trapezoidal wave form of Fig. 7a is related to the charging and discharging times as shown by Fig. 7c. Whatever wave form of pulse is used, the division between the positive and negative parts of the wave is such that the positive and negative areas are equal. The negative voltage across inductor 14 during retrace is:

$$E_s = \frac{L_{14}I_t}{(l-r)T} \quad (3)$$

The positive voltage during retrace is:

$$E_r = \frac{L_{14}I_t}{(r-q)T} \cdot \frac{l-r+q}{l-r} \quad (4)$$

Where $I_t$ is the current swing during the trace period or the useful current swing. The latter expression is obtained by a geometric construction based on the parabolic shape of the peaks and valleys of the saw-tooth current in Fig. 7b. The shape of the peaks and valleys is parabolic because it is obtained by the integration of a sloping straight line as indicated in Fig. 7b. Since the straight section of the inductor current wave during retrace in Fig. 7b is tangent to the valley parabolic curve, it would, if extended, intersect the extension of the trace at a time half way between zero and $qT$, that is, in the middle of the charging time. A corresponding intersection is obtained at the peak of the inductor current wave in the middle of the discharging time. The current slope is obtained by a geometric construction on the basis of the net time $(r-q)T$ and the current swing. The latter is slightly greater than $I_t$ in the ratio of the fraction at the end of Equation 4. The voltage swing is, therefore:

$$E_t = E_r + E_s = \frac{L_{14}I_t}{(l-r)T}\left(1 + \frac{l-r+q}{r-q}\right) = \frac{L_{14}I_t}{rT(l-r)(l-q/r)} \quad (5)$$

The voltage swing $E_t$ is explicitly proportional to the value of inductor 14 and implicitly related with capacitance 15 through $q$, which expresses the relative charging time.

In Fig. 7c the charging current is assumed to be equal to the current swing $I_t$ during the charging and discharging times. During the remainder of the retrace and all of the trace time, the voltage across the capacitance 15 is uniform so that the current therethrough is zero. During the charging time the voltage changes by the amount $E_t$ which is related with the current and charging time as follows:

$$E_t = \frac{I_t qT}{C_{15}} \quad (6)$$

Equations 5 and 6 include $E_t$ and $I_t$ in the same manner. It is convenient to combine these equations in terms of $R_t$ which may be regarded as the nominal load resistance of tube 10:

$$R_t = E_t/I_t = \frac{L_{14}}{rT(1-r)(1-q/r)} = \frac{qT}{C_{15}} \qquad (7)$$

The factor which then determines the charging and discharging time is:

$$q = \frac{C_{15}R_t}{T} \qquad (8)$$

The value of inductor 14 is:

$$L_{14} = R_t rT(1-r)(1-q/r) \qquad (9)$$

The factors which determine $q$ are known, so $q$ may be computed from Equation 8. All the other factors in Equation 9 are known so the value of inductor 14 may be computed directly. A greater amount of shunt capacitance $C_{15}$ requires a greater value of $q$, that is, a greater amount of the charging and discharging time. Such greater value of $q$ reduces the permissible inductance of the output circuit of tube 10 and thereby reduces the efficiency of the amplifier in the ratio $(1-q/r)$. In other words, in the presence of shunt capacitance, the same saw-tooth current flows through a lesser inductance and, therefore, develops a deflecting field of lower amplitude. The maximum amount of charging time which is available is half of the retrace time because an equal amount of time must be reserved for discharging at a similar rate. The maximum permissible value of capacitance 15 is obtained by making $q = r/2$. Therefore:

$$C_{15}(\text{max}) = \frac{rT}{2R_t} \qquad (10)$$

If the capacitance 15 is greater than this, it is impossible to charge it to the peak voltage and then to discharge it within the retrace time because only half the retrace time is available for charging. If the capacitance 15 has this greater value, the current is unable to charge it to the maximum permissible voltage so the peak voltage is no longer a limitation. It is still possible to deliver the saw-tooth current through inductor 14 but the amount of inductance is no longer limited by the peak voltage. The critical value of inductance corresponding to that in Equation 10 is:

$$L_{14}(\text{max}) = \frac{1}{2}R_t rT(1-r) \qquad (11)$$

For a greater value of shunt capacitance, $R_t$ is not a limitation so it may be eliminated between Equations 10 and 11 and the following relation obtained:

$$L_{14} = \frac{r^2T^2(1-r)}{4C_{15}} \qquad (12)$$

A greater value of capacitance $C_{15}$ thus reduces proportionately the value of inductor 14 and, therefore, the efficiency for scanning purposes.

It is thus seen that the arrangement comprises a periodic wave repeater for producing a magnetic field of saw-tooth wave form having relatively long trace and relatively short retrace periods. The generator includes a vacuum-tube repeater 10 having input and output circuits and upper and lower limiting output-current values. Inductance means 14 is included in the output circuit, and means comprising connections to source 17 are provided for exciting the repeater 10 to supply to the output circuit thereof a unidirectional current of substantially saw-tooth wave form having peak values approximately equal to the limiting values for producing the field. The output circuit of tube 10 has shunt capacitance represented by condenser 15 included therein, requiring a rapid change of voltage during each retrace period, rapidly to change the condition of charge of the shunt capacitance. Furthermore, it is seen that the output-current-controlling means constituting the wave-shaping impedance elements 11, 12, 13 coupled to the input circuit of tube 10 develops an output current pulse from the tube during each retrace period which rapidly changes from a first value corresponding to one of the limiting values of the tube to a second value substantially corresponding to the other of the limiting values of the tube and thereafter back to the above-mentioned first value during only the first part of the retrace period, and also develops an output-current pulse from the tube which rapidly changes from the above-mentioned second value to the above-mentioned first value and thereafter back to the above-mentioned second value in only the latter part of the retrace period for effecting the rapid changes of voltage required across the shunt capacitance 15.

In the above analysis, any time required for synchronizing purposes, which is generally done in a television receiver during the retrace interval, has been neglected. If time must be allowed for this purpose, it should be considered as part of the trace time and the retrace time should be correspondingly reduced.

The conditions above assumed do not yield exactly the ideal relations with regard to the value of inductor 14 and the pulse wave form. In Fig. 7d, the peak current in the charging time slightly exceeds the peak current during the trace interval. Also the current during part of the charging time is less than the peak current during the trace interval. The ideal condition is to have the total output current during the charging time uniform and equal to the peak current and to have similar conditions during the discharging interval. The ideal shape of output voltage pulse is similar to that of Fig. 7a but is slightly convex on the sides. This serves to flatten out the current curve during the charging and discharging intervals in accordance with the ideal conditions. The optimum value of inductor 14 under these conditions is substantially the same as those specified above. The main difference is that the pulse has convex sides.

It is noted that the current swing in inductor 14 is slightly greater than that of the total current from tube 10. This is seen in Fig. 7b where the current swing during the retrace interval is slightly greater than during the trace interval, the latter being equal to the current swing of the tube. This is the effect of the tendency towards resonance in inductor 14 and shunt capacitance 15. It is not useful because the additional swing occurs only during the retrace interval.

Under the conditions just described, the load diagram has the unusual form shown in Fig. 6b. The corners of the load diagram are rounded in order to show more clearly the path on the diagram. The load diagram of Fig. 6b has three loops, that is, two cross-overs, instead of one loop as shown in Fig. 6a. Fig. 6c is the load diagram for the critical values of inductor 14 and capacitance 15 given by Equations 10 and 11 under the conditions under consideration. The retrace loop in the load diagram of Fig. 6b disappears entirely leaving only two loops; that is, the load diagram of Fig. 6c has only one cross-over. A greater value of capacitance 15 causes the right-hand end of the diagram to contract without changing its shape. The three load diagrams of Figs. 6a—6c are shown for the same limits of current and voltage in tube 10. The average current $I_a$ in all cases is the same and is the mean value of the two limiting values, that is, the load diagram has, in each case, substantially the maximum possible dimensions within the normal operating limits of current and voltage of the tube 10. The average voltage, however, decreases with the trapezoidal narrowing of the pulse shape.

The circuit of Fig. 2 is somewhat similar to that of Fig. 1 and similar circuit elements have been given identical reference numerals. The primary distinction of the circuit of Fig. 2 is that the inherent series resistance 20 of the load inductor 14 is considered and compensating circuit elements are provided therefor. These compensating elements are divided between the input and output circuits of an additional tube 21. The corrective network between the tubes provides on the anode of tube 10 a voltage of the same wave form as the input voltage of tube 10 and this corresponds to the reciprocal impedance network of Fig. 1. Since the anode voltage of tube 10 is different from the voltage across the inductor 14, a corrective network modifying the input voltage to the system is required. The corrective network in the input circuit of the additional tube is therefore provided. The combined effect is to deliver across inductance 14 a voltage which has the same wave form as the input current pulses to the system. The correcting circuit of the input of tube 21 comprises a resistor 22 in series with a condenser 23 across the input circuit. The correction circuit in the output circuit of tube 21 comprises a resistor 24 and an inductor 25 in series with a parallel-connected resistor 26 and condenser 27, all across the output circuit of the tube. The following expressions apply to the circuit of Fig. 2:

$$C_{23}R_{22}=C_{27}/G_{26}=L_{14}/R_{20} \quad (13)$$
$$G_{26}=R_{20}C_{27}/L_{14} \quad (14)$$
$$C_{23}=L_{14}/R_{20}R_{22} \quad (15)$$

The arrangement of Fig. 3 is generally similar to that of Figs. 1 and 2 and similar circuit elements have been given identical reference numerals. The circuit of Fig. 3 differs from that of Fig. 2 in that a step-down transformer is used to couple inductor 14 with the output circuit of tube 10 to permit the use of a low impedance secondary circuit. The equivalent circuit of the transformer is represented by shunt inductor 30 and series inductor 31. The addition of the transformer necessitates a slight variation of the correction circuit of Fig. 2. Specifically, a condenser 32 is provided in parallel with resistor 26 and condenser 27 while a condenser 33 is provided in parallel with condenser 23. The following expressions apply to the circuit of Fig. 3:

$$C_{33}/C_{23}=C_{32}/C_{27}=L_{31}/L_{14} \quad (16)$$
$$C_{32}=C_{27} \cdot L_{31}/L_{14} \quad (17)$$
$$C_{33}=C_{23} \cdot L_{31}/L_{14} \quad (18)$$
$$C_{34}/C_{27}=L_{30}/L_{14} \quad (19)$$
$$C_{34}=C_{27} \cdot L_{30}/L_{14} \quad (20)$$

Attention is called to the fact that more complicated correcting arrangements are required for the load circuits shown in Figs. 2 and 3, more than one correcting branch being used in each instance. These branches are independently shown with an added tube between them. Frequently it is possible to insert these networks in different parts of the same stage or even to combine them in a more general four-terminal network without the use of an additional tube.

In Fig. 4 there is shown an arrangement for developing a saw-tooth voltage across the capacitance of deflecting plates represented by a condenser 40 in the output circuit of a vacuum tube 41. The step of integration in this case is performed by the capacitance of condenser 40. As before, resistor 16 represents the inherent shunt conductance in the output circuit of vacuum tube 41, while inductor 42 represents the inductance inherently in shunt with the output circuit. In order to provide the desired correction, two correcting circuits are provided in the input and output circuits of an additional tube 43. The correcting circuit in the input circuit of tube 43 consists only of a condenser 44, while the correcting network in the output circuit of tube 43 consists of a series-connected inductor 45, condenser 46, and resistor 47. In this case, the correcting network in the output circuit of tube 43 has impedance characteristics identical with the admittance of the load circuit of tube 41. The following expressions apply to the circuit of Fig. 4:

$$L_{45}/R_{47}=C_{40}/G_{16} \quad (21)$$
$$R_{47}=G_{16}.L_{45}/C_{40} \quad (22)$$
$$L_{45}C_{46}=C_{40}L_{42} \quad (23)$$
$$C_{46}=C_{40}.L_{42}/L_{45} \quad (24)$$

The circuit of Fig. 5 is generally similar to that of Fig. 4 and similar circuit elements have been given identical reference numerals. The primary distinction of the circuit of Fig. 5 is that a transformer, the series and shunt inductance of which are represented by inductors 50 and 51, respectively, is provided for coupling the deflecting capacitance 40 to the output circuit of vacuum tube 41 to permit the use of a high impedance secondary circuit. The addition of the transformer requires additional elements in the correcting circuits including an inductor 52 in series with condenser 44, together with an inductor 53 in series with resistor 47, condenser 46, and a condenser 54 in parallel with inductor 45. The following expressions are applicable to the circuit of Fig. 5:

$$L_{53}/L_{45}=C_{48}/C_{40} \quad (25)$$
$$L_{53}=L_{45}.C_{48}/C_{40} \quad (26)$$
$$C_{44}L_{52}=L_{45}C_{54}=C_{40}L_{51} \quad (27)$$
$$C_{54}=C_{40}L_{51}/L_{45} \quad (28)$$
$$L_{52}=L_{51}.C_{40}/C_{44} \quad (29)$$
$$L_{45}C_{46}=C_{40}L_{50} \quad (30)$$
$$C_{46}=C_{40}L_{50}/L_{45} \quad (31)$$

While the invention has been described with reference to linear vacuum-tube repeaters without feedback, the principles are applicable to some types of periodic wave generators in which linearity of response is obtained by means of suitable feed-back coupling.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A periodic wave generator for producing an electromagnetic field of a predetermined wave form including periodically recurring transients comprising, a vacuum-tube repeater having input and output circuits, means for applying to said input circuit pulses having the same period as said field and having a wave form related in a predetermined manner to that of said field, inductance means in said output circuit for producing said field, said output circuit having shunt capacitance effectively included therein which incidentally tends undesirably to affect the wave form of said field, and reactance means of both kinds so connected in said input circuit and so proportioned relative to the reactance of said output circuit that one kind of reactance in said input circuit at least partially compensates for the undesirable effect of said capacitance on the wave form of said field, the circuit constants being so proportioned with respect to the wave form of said input pulses as to develop output current and voltage waves from said tube of such wave forms that their load diagram has at least one cross-over and has substantially the maximum possible dimensions within the normal operating limits of current and voltage of said tube.

2. A periodic wave generator for producing a magnetic field of saw-tooth wave form having relatively long trace and relatively short retrace periods comprising, a vacuum-tube repeater having input and output circuits and upper and lower limiting output-current values, inductance means in said output circuit, means for exciting said repeater to supply said output circuit with a unidirectional current of substantially saw-tooth wave form having peak values approximately equal to said limiting values for producing said field, said output circuit having shunt capacitance included therein requiring a rapid change of voltage during each retrace period rapidly to change the condition of charge of said shunt capacitance, and output-current-controlling means coupled to one of said circuits for developing an output-current pulse from said tube during each retrace period which rapidly changes from a first value corresponding to one of said limiting values to a second value corresponding to the other of said limiting values and thereafter back to said first value in only a part of said retrace period for effecting said rapid change of voltage across said shunt capacitance.

3. A periodic wave generator for producing a magnetic field of saw-tooth wave form having relatively long trace and relatively short retrace periods comprising, a vacuum-tube repeater having input and output circuits and upper and lower limiting output current values, inductance means in said output circuit, means for exciting said repeater to supply said output circuit with a unidirectional current of substantially saw-tooth wave form having peak values approximately equal to said limiting values for producing said field, said output circuit having shunt capacitance included therein requiring a rapid change of voltage during each retrace period rapidly to change the condition of charge of said shunt capacitance, and output-current-controlling means coupled to said input circuit for developing an output current pulse from said tube during each retrace period which rapidly changes from a first value corresponding to one of said limiting values to a second value corresponding to the other of said limiting values and thereafter back to said first value in only a part of said retrace period for effecting said rapid change of voltage across said shunt capacitance.

4. A periodic wave generator for producing a magnetic field of saw-tooth wave form having relatively long trace and relatively short retrace periods comprising, a vacuum-tube repeater having input and output circuits and upper and lower limiting output-current values, inductance means in said output circuit, means for exciting said repeater to supply said output circuit with a unidirectional current of substantially saw-tooth wave form having peak values approximately equal to said limiting values for producing said field, said output circuit having shunt capacitance included therein requiring a rapid change of voltage during each retrace period rapidly to change the condition of charge of said shunt capacitance, and output-current-controlling means coupled to one of said circuits for developing an output-current pulse from said tube during each retrace period which rapidly changes from a first value corresponding to one of said limiting values to a second value corresponding to the other of said limiting values and thereafter back to said first value in only the first part of said retrace period for effecting said rapid change of voltage across said shunt capacitance.

5. A periodic wave generator for producing a magnetic field of saw-tooth wave form having relatively long trace and relatively short retrace periods comprising, a vacuum-tube repeater having input and output circuits and upper and lower limiting output-current values, inductance means in said output circuit, means for exciting said repeater to supply said output circuit with a unidirectional current of substantially saw-tooth wave form having peak values approximately equal to said limiting values for producing said field, said output circuit having shunt capacitance included therein requiring a rapid change of voltage during each retrace period rapidly to change the condition of charge of said shunt capacitance, and output-current-controlling means coupled to one of said circuits for developing an output-current pulse from said tube during each retrace period which rapidly changes from a first value corresponding to one of said limiting values to a second value corresponding to the other of said limiting values and thereafter back to said first value in only the latter part of said retrace period for effecting said rapid change of voltage across said shunt capacitance.

6. A periodic wave generator for producing a magnetic field of saw-tooth wave form having relatively long trace and relatively short retrace periods comprising, a vacuum-tube repeater having input and output circuits and upper and lower limiting output-current values, inductance means in said output circuit, means for exciting said repeater to supply said output circuit with a unidirectional current of substantially saw-tooth wave form having peak values approximately equal to said limiting values for producing said field, said output circuit having shunt capacitance included therein requiring a rapid change of voltage during each retrace period rapidly to change the condition of charge of said shunt capacitance, and output-current-controlling means coupled to one of said circuits for developing an output-current pulse from said tube during each retrace period which rapidly changes from a first value corresponding to one of said limiting values to a second value corresponding to the other of said limiting values and thereafter back to said first value in only the first part of said retrace period and for developing an output-current pulse from said tube which rapidly changes from said second value to said first value and thereafter back to said second value in only the latter part of said retrace period for effecting said rapid change of voltage across said shunt capacitance.

7. A periodic wave generator for producing an electric field of a predetermined wave form including periodically recurring transients comprising, a vacuum-tube repeater having input and output circuits, means for applying to said input circuit pulses having the same period as said field and having a wave form related in predetermined manner to that of said field, reactance means of a given kind in said output circuit for producing said field, said output circuit having effectively included therein additional reactance means of the other kind which incidentally tends undesirably to affect the wave form of said field, and reactance means of both kinds so connected in said input circuit and so proportioned relative to the reactance of said output circuit that one kind of reactance in said input circuit at least partially compensates for the undesirable effect of said additional reactance means on the wave form of said field, the circuit constants being so proportioned with respect to the wave form of said input pulses as to develop output current and voltage waves from said tube of such wave forms that their load diagram has at least one crossover and has substantially the maximum possible dimensions within the normal operating limits of current and voltage of said tube.

8. A periodic wave generator for producing an electrostatic field of a predetermined wave form including periodically recurring transients comprising, a vacuum-tube repeater having input and output circuits, means for applying to said input circuit pulses having the same period as said field and having a wave form related in a predetermined manner to that of said field, capacitance means in said output circuit for producing said field, said output circuit having shunt inductance effectively included therein which incidentally tends undesirably to affect the wave form of said field, and reactance means of both kinds so connected in said input circuit and so proportioned relative to the reactance of said output circuit that one kind of reactance in said input circuit at least partially compensates for the undesirable effect of said inductance on the wave form of said field, the circuit constants being so proportioned with respect to the wave form of said input pulses as to develop output current and voltage waves from said tube of such wave forms that their load diagram has at least one cross-over and has substantially the maximum possible dimensions within the normal operating limits of current and voltage of said tube.

HAROLD A. WHEELER.